US012706499B2

(12) United States Patent
Ledieu et al.

(10) Patent No.: US 12,706,499 B2
(45) Date of Patent: Aug. 11, 2026

(54) WOUND ROTOR WITH WINDING FLANGES AND SHAFT WITH RADIAL AND AXIAL FLUID CHANNELS

(71) Applicant: NOVARES FRANCE, Velizy-Villacoublay (FR)

(72) Inventors: Cédric Ledieu, Mont Saint Eloi (FR); Ludovic Milluy, Ecourt St Quentin (FR)

(73) Assignee: NOVARES FRANCE, Velizy-Villacoublay (FR)

( * ) Notice: Subject to any disclaimer, the term of this patent is extended or adjusted under 35 U.S.C. 154(b) by 212 days.

(21) Appl. No.: 18/700,072

(22) PCT Filed: Oct. 13, 2022

(86) PCT No.: PCT/FR2022/051928
§ 371 (c)(1),
(2) Date: Apr. 10, 2024

(87) PCT Pub. No.: WO2023/062322
PCT Pub. Date: Apr. 20, 2023

(65) Prior Publication Data

US 2024/0348118 A1 Oct. 17, 2024

(30) Foreign Application Priority Data

Oct. 15, 2021 (FR) ....................................... 2110962

(51) Int. Cl.
*H02K 1/32* (2006.01)
*H02K 1/26* (2006.01)
(Continued)

(52) U.S. Cl.
CPC ............... *H02K 1/32* (2013.01); *H02K 1/265* (2013.01); *H02K 3/24* (2013.01); *H02K 7/003* (2013.01); *H02K 2203/12* (2013.01)

(58) Field of Classification Search
CPC H02K 1/24; H02K 3/527; H02K 3/52; H02K 3/522; H02K 1/26; H02K 1/32;
(Continued)

(56) References Cited

U.S. PATENT DOCUMENTS 5,666,016 A * 9/1997 Cooper .................... H02K 3/24 310/59
6,727,634 B2 * 4/2004 Tornquist ............... H02K 3/527 310/270

(Continued)

FOREIGN PATENT DOCUMENTS

CN 111769673 A 10/2020
DE 102016205653 A1 10/2017

OTHER PUBLICATIONS

International Search Report for corresponding application PCT/FR2022/051928 dated Oct. 13, 2022; Mail date Jan. 31, 2023.

*Primary Examiner* — Maged M Almawri
(74) *Attorney, Agent, or Firm* — CANTOR COLBURN LLP

(57) ABSTRACT

The invention relates to a wound rotor (10) for an electric motor (1), comprising: —a rotor shaft (12) rotatably mounted about an axis (X); —rotor laminations (14) mounted coaxially on the rotor shaft (12), said rotor laminations (14) having alternating poles and interpolar spaces; —a front winding flange (15) and a rear winding flange (15') mounted coaxially on the rotor shaft (12) and arranged axially on either side of the rotor laminations (14); —windings (16) partially surrounding the poles (141) of the rotor laminations (14) and the front and rear winding flanges (15, 15'); wherein a plurality of fluid flow channels pass through the front winding flange (15) and/or the rear winding flange (15'), through which flow channels a cooling fluid can flow.

14 Claims, 6 Drawing Sheets

(51) Int. Cl.
*H02K 3/24* (2006.01)
*H02K 7/00* (2006.01)

(58) Field of Classification Search
CPC H02K 1/265; H02K 1/02; H02K 1/00; H02K 1/28; H02K 1/325; H02K 3/18; H02K 19/02; H02K 19/16; H02K 19/38; H02K 9/22; H02K 9/02; H02K 9/19; H02K 2203/12
USPC ......... 310/59, 261.1–266, 216.001, 216.074, 310/216.091, 216, 4, 61, 52, 54, 57, 58, 310/262, 433, 216.132, 216.086, 79, 310/216.013, 216.004, 269
See application file for complete search history.

(56) References Cited

U.S. PATENT DOCUMENTS

| | | | | |
|---|---|---|---|---|
| 6,791,230 | B2 * | 9/2004 | Tornquist | H02K 3/527 310/214 |
| 6,849,987 | B2 * | 2/2005 | Tornquist | H02K 3/527 310/260 |
| 7,982,359 | B2 * | 7/2011 | McCabe | H02K 9/04 310/269 |
| 10,523,079 | B2 * | 12/2019 | Huang | H02K 1/02 |
| 10,931,171 | B2 * | 2/2021 | Chatterjee | H02K 9/19 |
| 11,984,766 | B2 * | 5/2024 | Chatterjee | H02K 1/28 |
| 12,068,640 | B2 * | 8/2024 | Pal | H02K 9/00 |
| 2010/0133946 | A1 * | 6/2010 | Lemmers, Jr. | H02K 3/527 310/214 |
| 2012/0126643 | A1 * | 5/2012 | Zhong | H02K 1/325 310/59 |
| 2016/0043613 | A1 * | 2/2016 | Patel | H02K 9/22 310/52 |
| 2016/0204663 | A1 * | 7/2016 | Huang | H02K 1/325 310/59 |
| 2016/0211713 | A1 | 7/2016 | Patel et al. | |
| 2016/0285332 | A1 * | 9/2016 | Huang | H02K 19/38 |
| 2020/0106342 | A1 | 4/2020 | Chatterjee et al. | |
| 2023/0246498 | A1 * | 8/2023 | Chatterjee | H02K 1/28 310/54 |

* cited by examiner

WOUND ROTOR WITH WINDING FLANGES AND SHAFT WITH RADIAL AND AXIAL FLUID CHANNELS

TECHNICAL FIELD

The disclosure concerns a wound rotor for an electric motor arranged to allow a better removal of the heat generated during its operation. The disclosure also concerns an electric motor comprising such a wound rotor.

BACKGROUND

Generally, current electric motors include a rotor secured to a shaft and a stator which surrounds the rotor. The stator is mounted in a casing which includes bearings for the rotational mounting of the shaft. The stator generally includes a body consisting of a lamination bundle forming a crown, the inner face of which is provided with teeth delimiting two by two a plurality of slots open towards the inside of the stator body and intended to receive phase windings. These phase windings pass through the slots of the stator body and form winding heads projecting on either side of the stator body. The phase windings may for example consist of a plurality of U-shaped conductor segments, the free ends of two adjacent segments being connected together by welding. The rotor can be of several types.

A possible configuration consists of a wound rotor consisting of a stack of laminations mounted coaxially on the rotor shaft, said stack of laminations having several pairs of poles, each pole being spaced from an adjacent pole by an interpolar space, and windings surrounding the poles of the stack of laminations and being connected to a collector generally formed by copper rings coming in front of brushes for suppling the windings.

During the operation of the motor, currents flowing through the phase windings of the stator and the windings of the rotor generate a significant heat that must be removed. To cool the motor, there are currently several solutions. One of these solutions is to spray a cooling fluid inside the motor such that it is in contact with the phase windings of the stator and the windings of the rotor. This solution presents however the disadvantage of not projecting the cooling fluid directly onto the phase windings of the stator and the windings of the rotor which generates excess consumption of the cooling fluid to allow good removal of the heat generated by these phase windings and these windings. Another possible solution, described in document US 2020/106342 A1, consists of equipping an electric motor with a wound rotor.

BRIEF SUMMARY

The disclosure therefore aims to propose a wound rotor and an electric motor comprising such a rotor arranged to allow a better removal of the heat generated during its operation, by cooling the windings of the rotor and/or the winding heads of the stator as closely as possible, and not presenting the disadvantages of the existing solutions described previously.

To this end, the disclosure concerns a wound rotor for an electric motor comprising:

- a rotor shaft mounted to rotate about an axis;
- a stack of laminations mounted coaxially on the rotor shaft, said stack of laminations extending between a front lateral face and a rear lateral face and presenting an alternation of poles and interpolar spaces;
- a front winding flange and a rear winding flange mounted coaxially on the rotor shaft and arranged axially on either side of the stack of laminations so as to be contiguous respectively to the front and rear lateral faces of the stack of laminations, said front and rear winding flanges each having a series of T-shaped radial branches, each of said radial branches being aligned axially with one of the poles of the stack of laminations and having, preferably, a profile similar or identical to that of said pole in a plane perpendicular to the axis of the shaft;
- windings partially surrounding the poles of the stack of laminations and the radial branches of the front and rear winding flanges;

in which the shaft is provided with at least one internal channel for circulating a cooling fluid, called a fluid inlet channel, and in that the front winding flange and/or the rear winding flange is crossed by several radial fluid outlet channels oriented radially relative to the axis of the shaft and inside which a cooling fluid can circulate, each of said radial fluid outlet channels being in fluid communication with said fluid inlet channel and opening at a radial fluid outlet opening located at the external periphery of said front winding flange and/or said rear winding flange, characterized in that the front or rear winding flange is also crossed by a plurality of intermediate channels, each of said intermediate channels being oriented orthogonally to one of the radial fluid outlet channels and opening at a first end, in said radial fluid outlet channel and, at a second end, in an axial fluid outlet channel opening at an axial fluid outlet opening located on an external lateral face of said front, respectively rear, winding flange.

Thus configured, the rotor of the disclosure can advantageously be cooled by means of a cooling fluid circulating inside the rotor shaft then inside the front and/or rear winding flange, said cooling fluid which can then be projected directly onto the winding heads of the stator at the level of the radial fluid outlet openings, thus allowing better heat removal from the electric motor integrating the rotor of the disclosure.

The rotor of the disclosure may also comprise one or more of the following characteristics:

- the shaft is provided with a first internal channel for circulating a cooling fluid, called the first fluid inlet channel, and a second internal channel for circulating a cooling fluid, called the second fluid inlet channel, and the front winding flange, respectively the rear winding flange, is crossed by several radial fluid outlet channels radially oriented relative to the axis of the shaft and inside which a cooling fluid can circulate, each of said radial fluid outlet channels being in fluid communication with the first fluid inlet channel, respectively the second fluid inlet channel, and opening at a radial fluid outlet opening located at the external periphery of said front winding flange, respectively said rear winding flange.
- the shaft comprises a front end portion and a rear end portion separated from the front end portion by a central portion, the front end portion, respectively the rear end portion, being crossed by a blind hole aligned along the axis of the shaft, said blind hole forming the first fluid inlet channel, respectively the second fluid inlet channel.
- the shaft comprises a front end portion and a rear end portion separated from the front end portion by a central portion, the central portion and at least partially the front and rear end portions being crossed by a blind hole aligned along the axis of the shaft, said blind hole forming the fluid inlet channel.

several connecting holes oriented radially relative to the axis of the shaft are formed inside the front end portion, respectively the rear end portion, so as to open on one side, in the fluid inlet channel, or respectively in the first and second fluid inlet channels, and, on the other side, in the radial fluid outlet channels.

each of the radial fluid outlet channels passes through one of the radial branches of the front, respectively rear, winding flange.

the front, respectively rear, winding flange has an internal lateral face in contact with the front, respectively rear lateral face of the stack of laminations, said internal lateral face being provided with a cavity in which a cover is housed, said cavity being configured to form, in combination with said cover, a first section of the radial fluid outlet channels, as well as the intermediate channels and the axial fluid outlet channels.

the cavity comprises a central part of annular shape, which extends radially from a hollowed central zone of the front, respectively rear, winding flange, said central zone being configured to partially house the rotor shaft, and several radial extensions extending radially from said central part, each of the radial extensions being aligned with one of the radial branches of the front, respectively rear, winding flange.

the cavity is delimited by a bottom wall and by several lateral walls oriented perpendicular to said bottom wall, said bottom wall being provided with first grooves oriented radially relative to the axis of the shaft and second grooves oriented in orthoradial manner relative to the axis of the shaft, said first and second grooves forming respectively, in combination with corresponding grooves of the cover, the first section of the radial fluid outlet channels and the intermediate channels.

several lateral walls, which are oriented radially relative to the axis of the shaft, are provided with third grooves oriented parallel to the axis of the shaft, said third grooves forming, in combination with corresponding grooves of the cover, the axial fluid outlet channels.

the cavity is configured to form housings arranged radially about the central part, each of the housings having a specific shape and being intended to receive a corresponding connecting element of the cover having a shape complementary to that of said housing, said specific shape and said complementary shape being configured to prevent any relative movement between the cover and the front, respectively rear winding flange, in a radial direction, thus securing the coupling of the cover on the front, respectively rear winding flange.

the housings of the cavity have a dovetail shape.

the front and rear winding flanges are made of a material selected from aluminum or plastic.

The disclosure also concerns an electric motor comprising a wound rotor as defined above and an annular stator which surrounds the rotor coaxially with the shaft, winding heads projecting axially from either side of the stator, the radial fluid outlet openings, through which the cooling fluid exits the front and/or rear winding flanges, being aligned axially with the winding heads so as to allow a cooling of said winding heads via said cooling fluid.

BRIEF DESCRIPTION OF THE DRAWINGS

The disclosure will be better understood on reading the non-limiting description which follows, made with reference to the attached figures.

DETAILED DESCRIPTION

Throughout the description and in the claims, the terms axial and radial and their derivatives are defined relative to the axis of rotation of the rotor. Thus, an axial orientation refers to an orientation parallel to the axis of rotation of the rotor and a radial orientation refers to an orientation perpendicular to the axis of rotation of the rotor. An orthoradial orientation refers to an orientation perpendicular to a radial orientation in a plane perpendicular to the axis of rotation of the rotor. Moreover, by convention, the terms «front» and «rear» refer to separate positions along the axis of rotation of the rotor. In particular, the «front» end of the rotor shaft corresponds to the end of the shaft on which a pulley, a pinion, a spline intended to transmit the rotational movement of the rotor to any other similar movement transmission device can be fixed.

Figure 1:
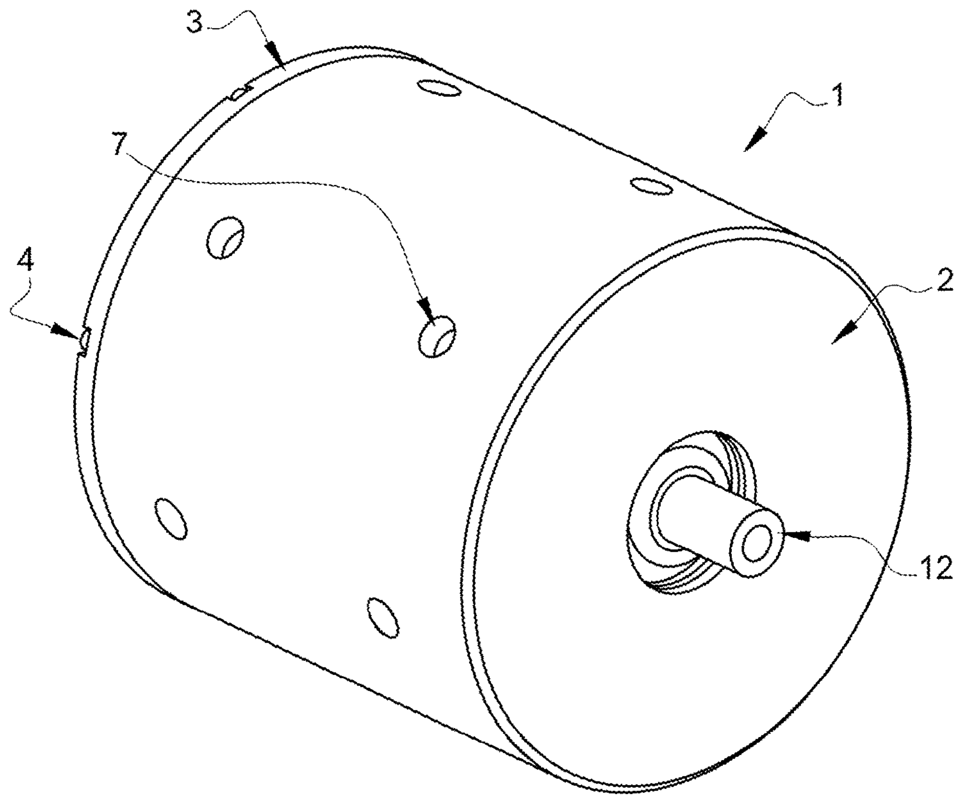
FIG. 1 is a perspective view of an electric motor equipped with a wound rotor according to the disclosure, the motor being seen from its front side.
Figure 2:
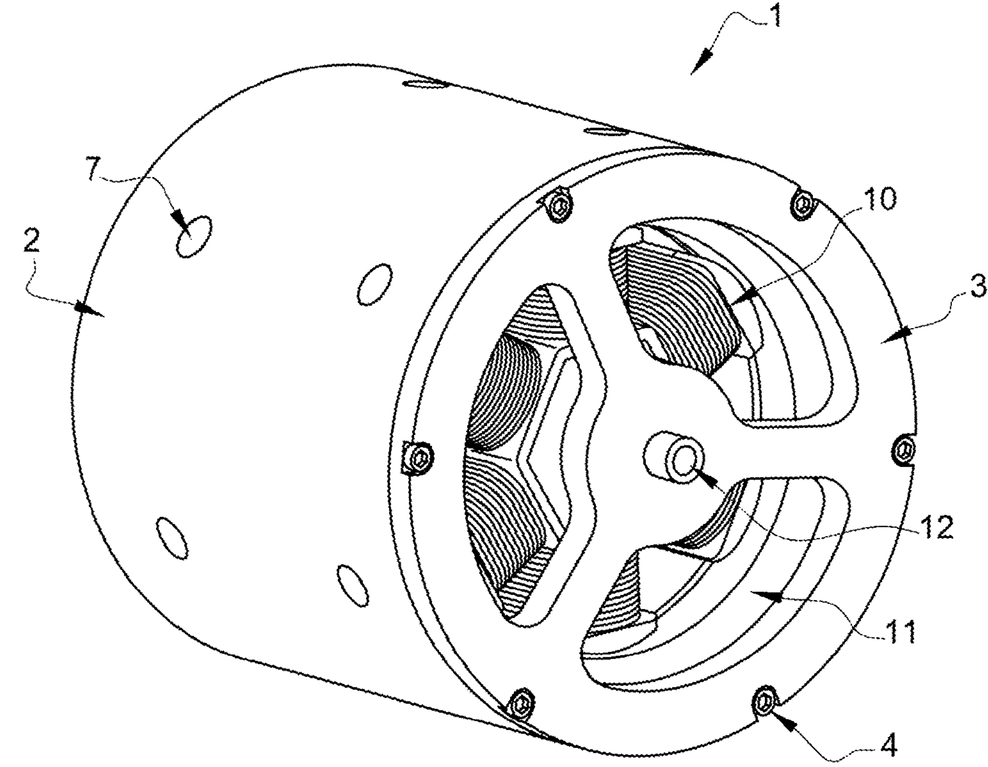
FIG. 2 is a view similar to FIG. 1, the motor being seen from its rear side.
Figure 3:
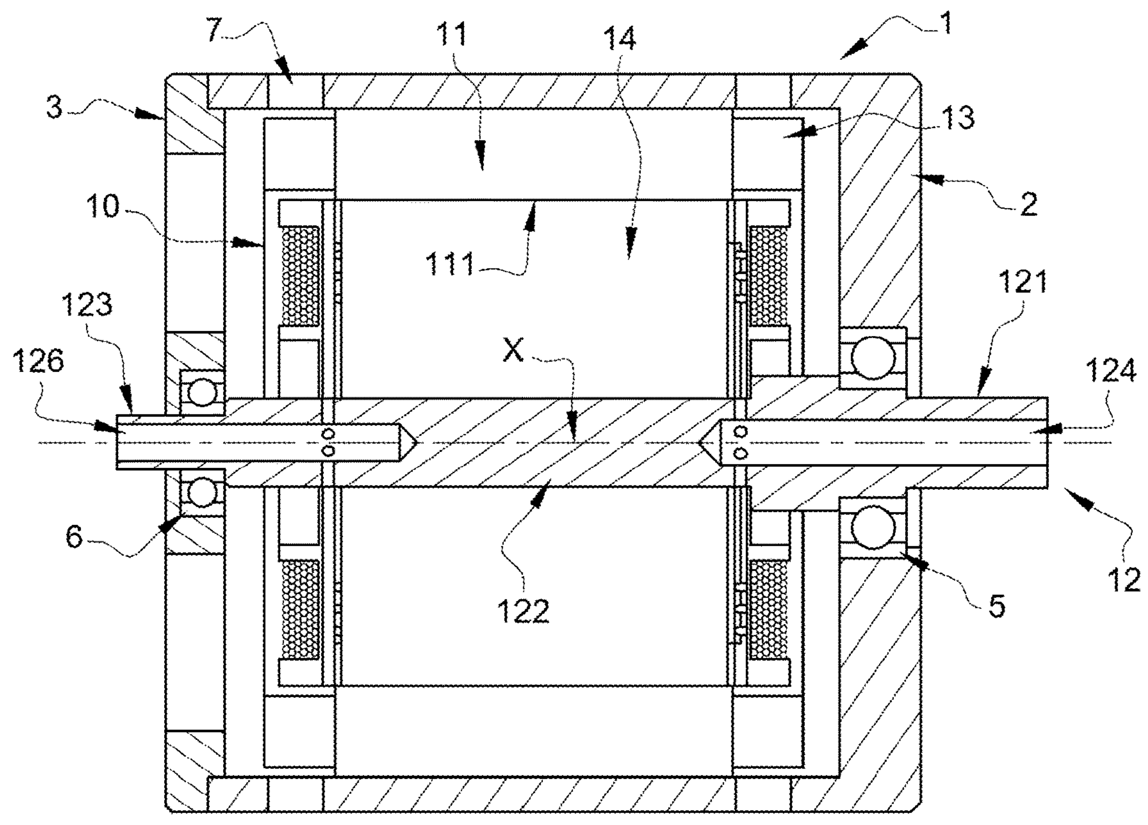
FIG. 3 is a longitudinal sectional view of the motor of FIGS. 1 and 2.

FIGS. 1 to 3 represent an electric motor 1 according to the disclosure comprising two bearings, respectively a bell-shaped front bearing 2 and a disc-shaped rear bearing 3, connected together by means of screws 4, the front bearing 2 housing a rotor 10 secured in rotation to a shaft 12 and an annular stator 11 which surrounds the rotor 10 coaxially with the shaft 12. As shown in FIG. 3, the front and rear bearings 2, 3 each centrally carry a ball bearing respectively 5 and 6 for the rotational mounting of the shaft 12. Winding heads 13 project axially from either side of the stator 11 and are housed in the intermediate space separating the stator 11 from the respective bearings 2, 3. The front and rear bearings 2, 3 will advantageously be made of metal. In the shown configuration, the front bearing 2 is provided with a series of openings 7 which will be used for the removal of a cooling fluid outside the motor 1. This cooling fluid will be able to penetrate inside the internal space defined by the front and rear bearings 2, 3 via a first internal circulation channel 124, called the first fluid inlet channel, and a second internal channel 126 for circulating a cooling fluid, called the second fluid inlet channel. The first and second fluid inlet channels 124, 126 are respectively defined by blind holes aligned along the axis X of the shaft 12 and formed through front 121 and rear 123 end portions of the shaft 12, said end portions 121, 123 being separated by a solid central portion 122.

Figure 4:
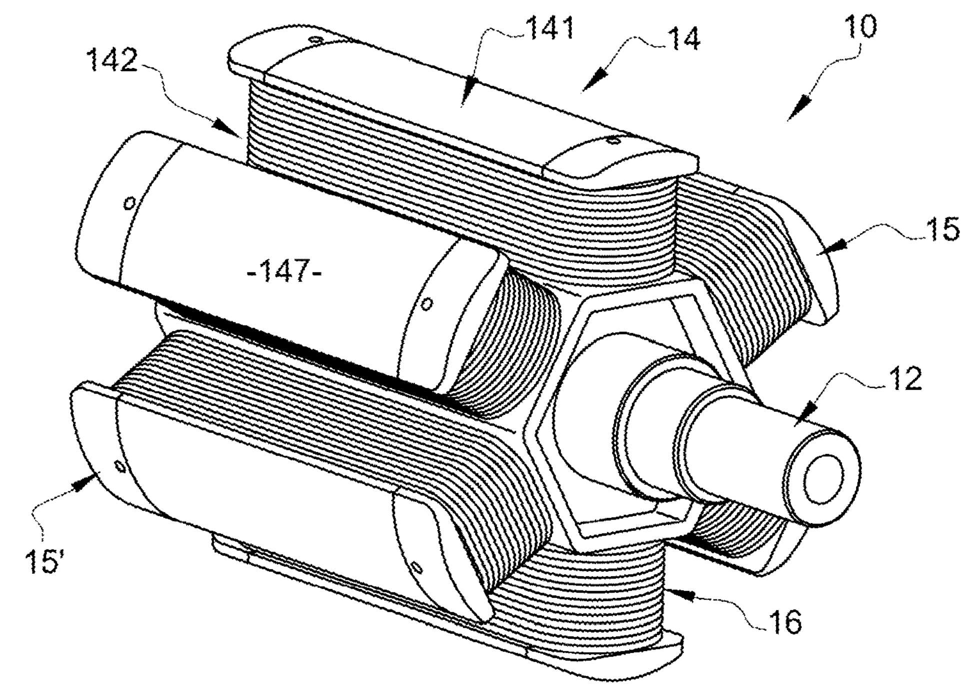
FIG. 4 is a perspective view of the wound rotor equipping the motor of FIGS. 1 and 2.
Figure 5A:
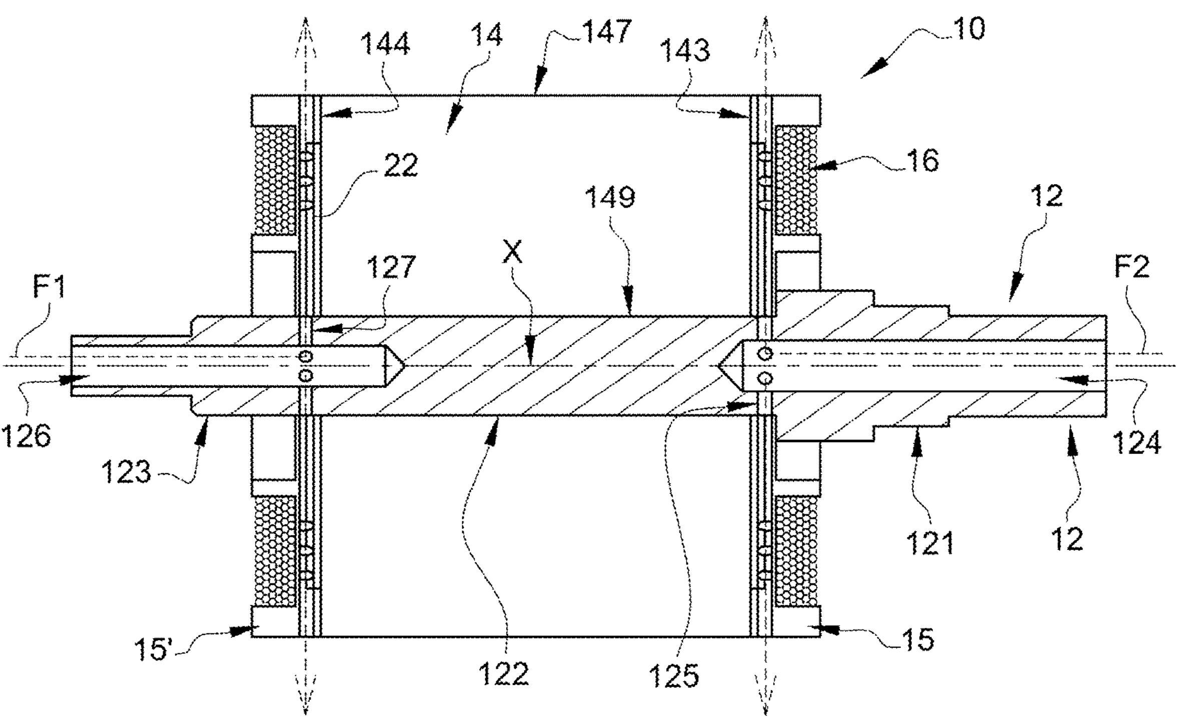
FIG. 5*a* is a longitudinal sectional view of the rotor of FIG. 4.

FIGS. 4 and 5*a* represent a rotor 10 according to a particular embodiment of the disclosure. The rotor 10 is of the wound type and in particular comprises a stack of laminations 14 formed of an axial bundle of laminations which extend in a radial plane perpendicular to the axis X of the shaft 12. The stack of laminations 14 is mounted coaxially on the shaft 12. The shaft 12 can be force-fitted inside a central opening of the stack of laminations 14 so as to rotatably connect the body of the rotor with the shaft 12. The stack of laminations 14 extends between a front lateral face 143 and a rear lateral face 144 and presents a circumferential alternation of poles 141 and interpolar spaces 142. The interpolar spaces 142 extend between two adjacent poles 141 and form recesses extending over the entire length of the stack of laminations 14, between the two adjacent poles 141. In the shown configuration, the poles 141 are 6 in number and are arranged about the shaft 12 so as to be regularly spaced, two adjacent poles 141 being spaced by an angle of approximately 60°. The poles 141 extend radially from an annular part of the stack of laminations 14 provided with a central opening 149 configured to partially house the shaft 12 of the rotor. Each pole 141 has a T-shaped profile in a plane orthogonal to the axis X and has, in the radial direction, a narrow section extended by an enlarged section of convex shape. The enlarged convex section has an external peripheral surface 147 which, in the mounted position of the rotor 10, faces an internal peripheral surface 111 of the stator 11 (see FIG. 3), said external peripheral surface 147 being spaced from said internal peripheral surface 111 by a distance less than 1 mm.

Each pole 141 receives a longitudinal winding 16 intended to generate a magnetic flux in the rotor pole. The windings 16 are wound about the poles 141 and about front 15 and rear 15' winding flanges which axially surround the stack of laminations 14. These flanges 15, 15' are mounted coaxially on the shaft 12 of the rotor and arranged axially in either side of the stack of laminations 14 such as to be contiguous respectively to the front and rear lateral faces 143, 144 of the stack of laminations 14.

Figure 6:
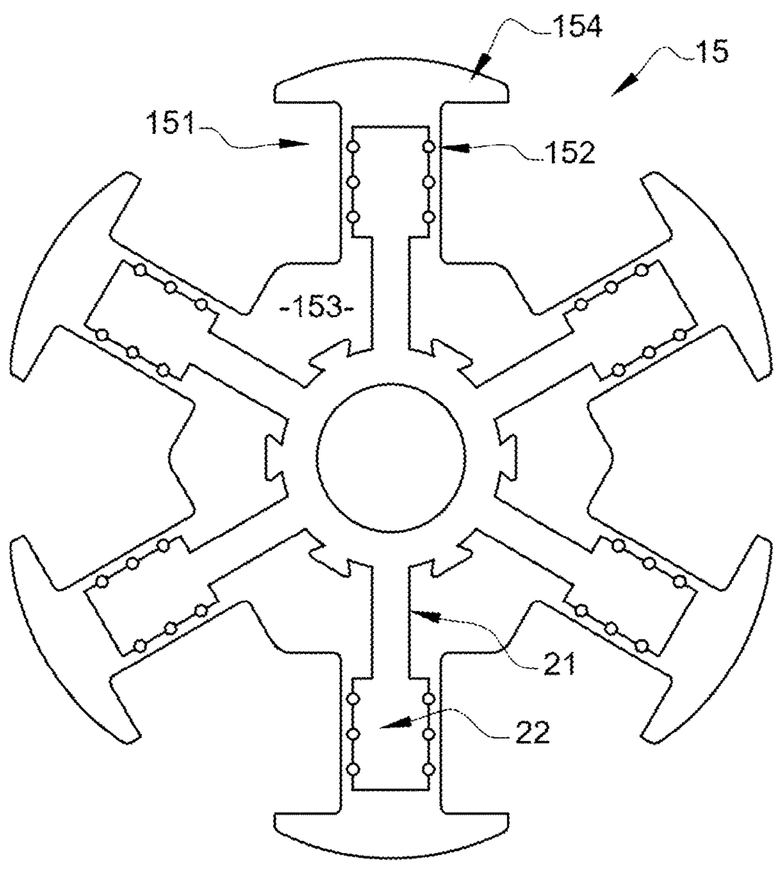
FIG. 6 is an axial view of one of the winding flanges equipping the rotor of FIG. 4.
Figure 7:
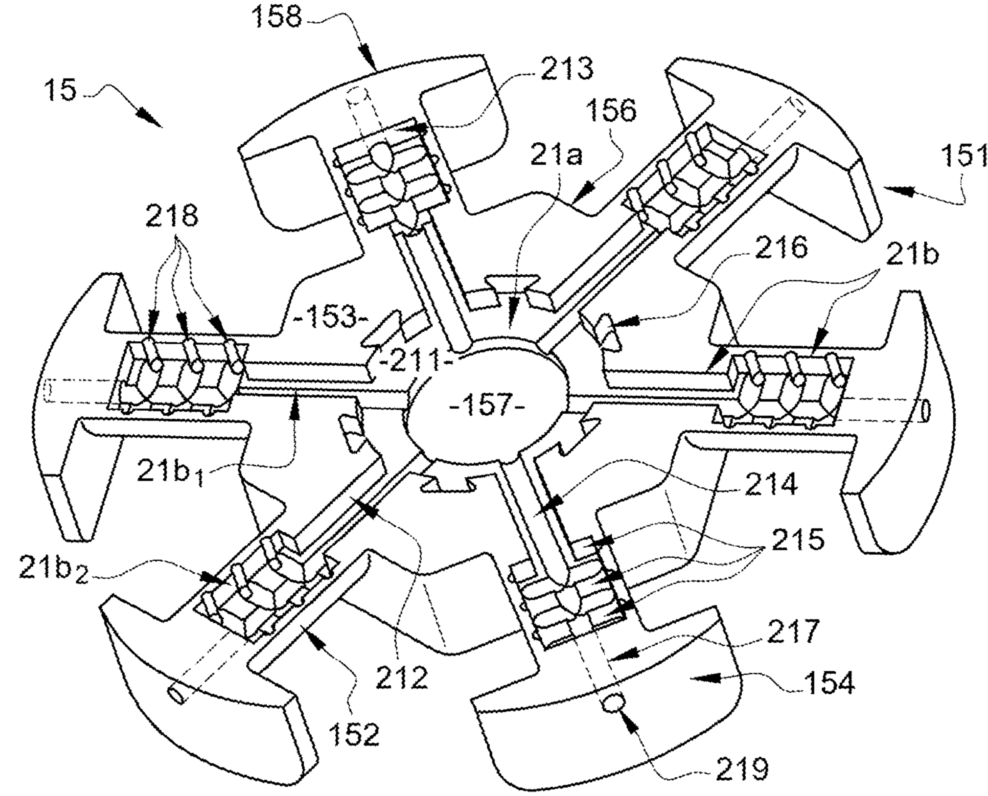
FIG. 7 is a perspective view of the internal face of the flange shown in FIG. 6, the cover having been removed.

With reference to FIG. 6, the internal lateral face 153 of the front winding flange 15 is shown which is oriented towards the stack of laminations 14. The front and rear winding flanges 15 and 15' having the same profile, the details of structure given below with reference to FIG. 6 are also applied to the rear winding flange 15'. The front winding flange 15 has a series of T-shaped radial branches 151. Each of the radial branches 151 is aligned axially with one of the poles 141 of the stack of laminations 14 and presents, in the preferred configuration shown in FIG. 4, a profile similar or identical to that of the pole 141 with which it is aligned in a plane orthogonal to the axis of the shaft 12. Thus, each radial branch 151 has, in the radial direction, a narrow section 152 extended by an enlarged section 154 of convex shape.

The front winding flange 15 is moreover provided with a central cavity 21 in which a front cover 22 is housed. As described in detail in the following paragraphs, the cavity 21 and the front cover 22 are configured to form a plurality of fluid circulation channels inside the front winding flange 15, these fluid circulation channels communicating fluidly with the first fluid inlet channel 124 of the shaft 12 and opening in particular at the level of fluid outlet openings located at the external periphery of said front winding flange 15 and oriented towards the winding heads 13 of the stator 11 or towards the windings 16. Thus, as shown in FIG. 5*a*, a cooling fluid F1 supplied from the first fluid inlet channel 124 will be able to circulate inside the front winding flange 15 via said fluid circulation channels before being projected towards the winding heads 13 and/or the windings 16, thus allowing effective cooling of the rotor 10 and the stator 11. In the same way, a cooling fluid F2 supplied from the second fluid inlet channel 126 will be able to circulate inside similar fluid circulation channels formed inside the rear winding flange 15' before being projected towards the winding heads 13 protruding from the rear of the stator 11, and/or the windings 16 surrounding the radial branches of the rear winding flange 15'.

Figure 5B:
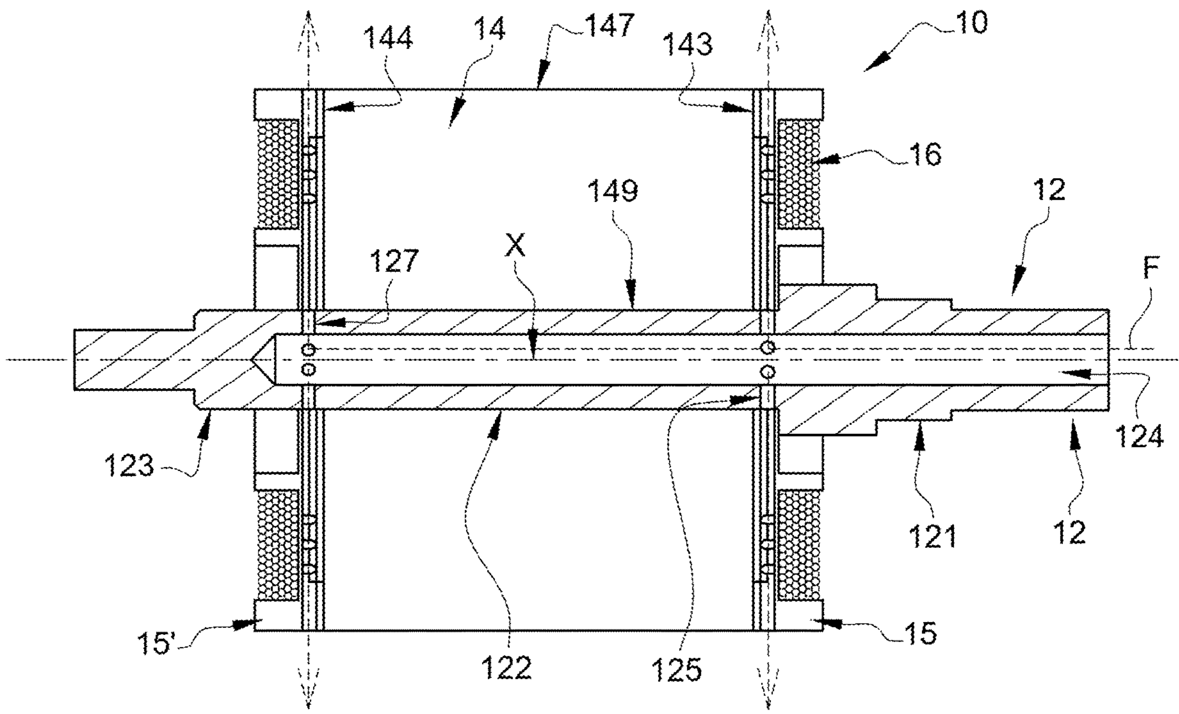
FIG. 5*b* is a longitudinal sectional view of a rotor according to a variant of the disclosure.

In a variant of the disclosure, shown in FIG. 5*b*, it will be possible to introduce a cooling fluid F inside the rotor 10 via a single internal circulation channel 124, called fluid inlet channel, opening at the front end portion 121 of the shaft 12. In the shown configuration, the fluid inlet channel 124 is defined by a blind hole aligned along the axis X of the shaft 12 and formed successively through the front end portion 121, the central portion 122 and part of the rear end portion 123 of the shaft 12. Thus, the cooling fluid F supplied from the fluid inlet channel 124 will be able to circulate successively inside the front winding flange 15 via fluid circulation channels formed inside said front winding flange 15 before being projected towards the winding heads 13 and/or windings 16, then inside similar fluid circulation channels formed inside the rear winding flange 15' before being projected towards the winding heads 13 protruding from the rear of the stator 11, and/or windings 16 surrounding the radial branches of the rear winding flange 15'.

In another possible configuration (not shown), a single fluid inlet channel may open at the rear end portion 123 of the shaft 12. It may be defined by a blind hole aligned along the axis of the shaft 12 and formed successively through the rear end portion 123, the central portion 122 and part of the front end portion 121 of the shaft 12. Thus, the cooling fluid supplied from the fluid inlet channel can circulate successively inside the rear winding flange 15' via fluid circulation channels formed inside said rear winding flange 15' before being projected towards the winding heads 13 and/or windings 16, then inside similar fluid circulation channels formed inside the front winding flange 15 before being projected towards the winding heads 13 protruding at the front of the stator 11, and/or the windings 16 surrounding the radial branches of the front winding flange 15.

In another possible configuration (not shown), a single fluid inlet channel may open at the front 121 or rear 123 end portion of the shaft 12. It can be defined by a blind hole aligned along the axis X of the shaft 12 and formed only through the front 121 or rear 123 end portion. In this configuration, only the front 15, or rear 15' winding flange, will be crossed by fluid circulation channels, so that only the winding heads 13 protruding at the front, or at the rear, of the stator 11 and/or the windings 16 surrounding the radial branches of the front 15, or rear 15' winding flange, will be cooled by the cooling fluid.

A particular configuration of the front winding flange 15 and its associated front cover 22 is shown in FIGS. 7 to 10. The rear winding flange 15' having a structure substantially identical to that of the front winding flange 15, the technical details given below will be applied similarly to the rear winding flange 15' and its associated rear cover.

The front winding flange 15 is substantially in the form of a star-shaped structure comprising a central part 156 of hexagonal shape extended on each of its sides by the radial branches 151 in the shape of a T. The central part 156 has a hollowed central zone 157, which is configured to partially house the shaft 12 of the rotor.

Figure 8:
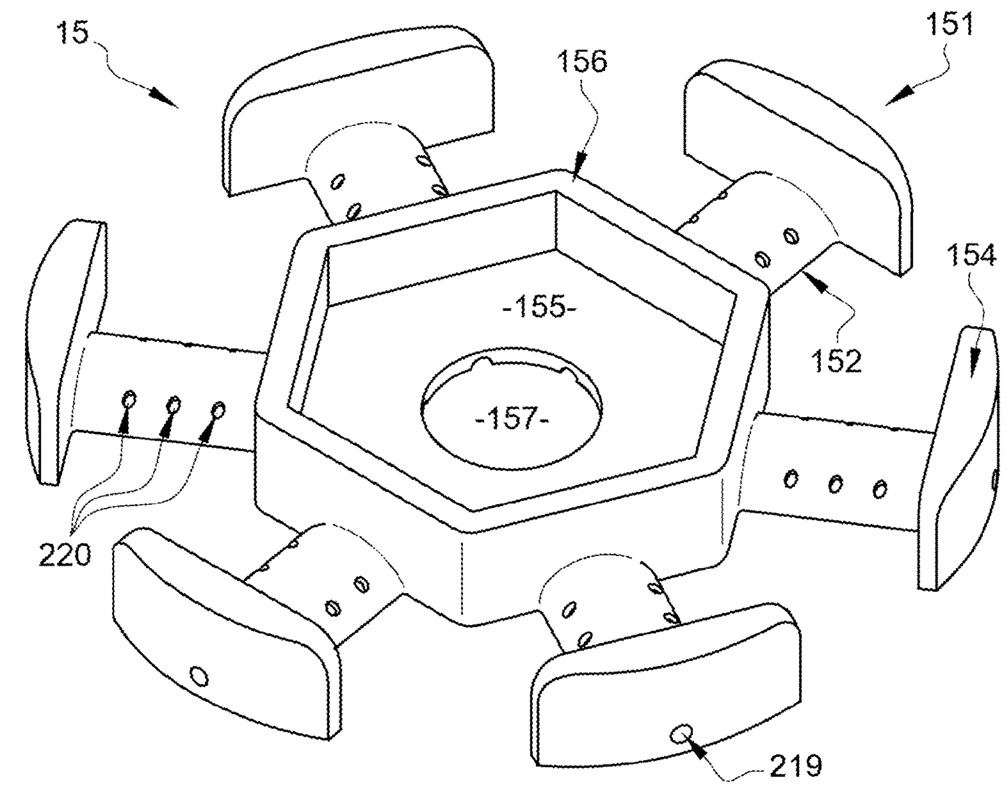
FIG. 8 is a perspective view of the external face of the flange shown in FIG. 6.

The front winding flange 15 has an internal lateral face 153 (visible in FIG. 7) and an external lateral face 155 (visible in FIG. 8). The internal lateral face 153 is in contact with the front lateral face 143 of the stack of laminations 14 and the external lateral face 155 is oriented towards the front bearing 2.

The external lateral face 155 is configured to define between the enlarged section 154 of each radial branch 151 and the central part 156 a radial space making it possible to house the windings 16.

The internal lateral face 153, mainly flat, is provided with a central cavity 21 which extends radially from the central zone 157 towards the external peripheral faces 158 of the front winding flange 15, which are defined by the curved external sides of the enlarged sections 154 of the radial branches 151.

The cavity 21 comprises in particular a central part 21*a* of annular shape, which adjoins the central zone 157, and several radial extensions 21*b* extending radially from said central part 21*a*. Each of the radial extensions 21*b* is aligned with one of the radial branches 151 of the front winding flange 15 and comprises a narrow portion 21*b*1 extended radially by an enlarged portion 21*b*2.

The cavity 21 is in particular delimited by a bottom wall 211, by several lateral walls 212 oriented radially with respect to the axis X, and by several lateral walls 213 oriented orthoradially relative to the axis X.

The bottom wall 211 is provided with first grooves 214 oriented radially with respect to the axis X and with second grooves 215 oriented orthoradially with respect to the axis X. The lateral walls 212 are, for their part, provided with third grooves 218 oriented parallel to the axis X, each of the third grooves 218 opening onto an axial fluid outlet opening 220 located on the external lateral face 155 of the winding flange 15, at the level of the radial space which serves as housing for the windings 16.

In the shown configuration, the first grooves 214 are 6 in number, each of the first grooves 214 being formed through the central part 21*a* and the narrow and enlarged portions of one of the radial extensions 21*b* and extending from a first end adjoining the central zone 157 to a second end located at one of the lateral walls 213 of the cavity 21. This second end opens onto a through opening 217 (shown in dotted lines in FIG. 7) formed through the enlarged section 154 of one of the radial branches 151. This through opening 217 opens outside the winding flange 15 at a radial fluid outlet opening 219 which is oriented towards the winding heads 13 of the stator 11.

In the shown configuration, the second grooves 215 are 36 in number, each of the second grooves 215 being formed through the enlarged portion 21*b*2 of one of the radial extensions 21*b* and extending from a first end adjoining one of the first grooves 214 to a second end located at one of the lateral walls 212 of the cavity 21. This second end opens onto one of the third grooves 218.

The first, second and third grooves 214, 215 and 218 are configured to form, in combination with corresponding grooves of the front cover 22, fluid circulation channels inside the front winding flange 15.

Figure 9:
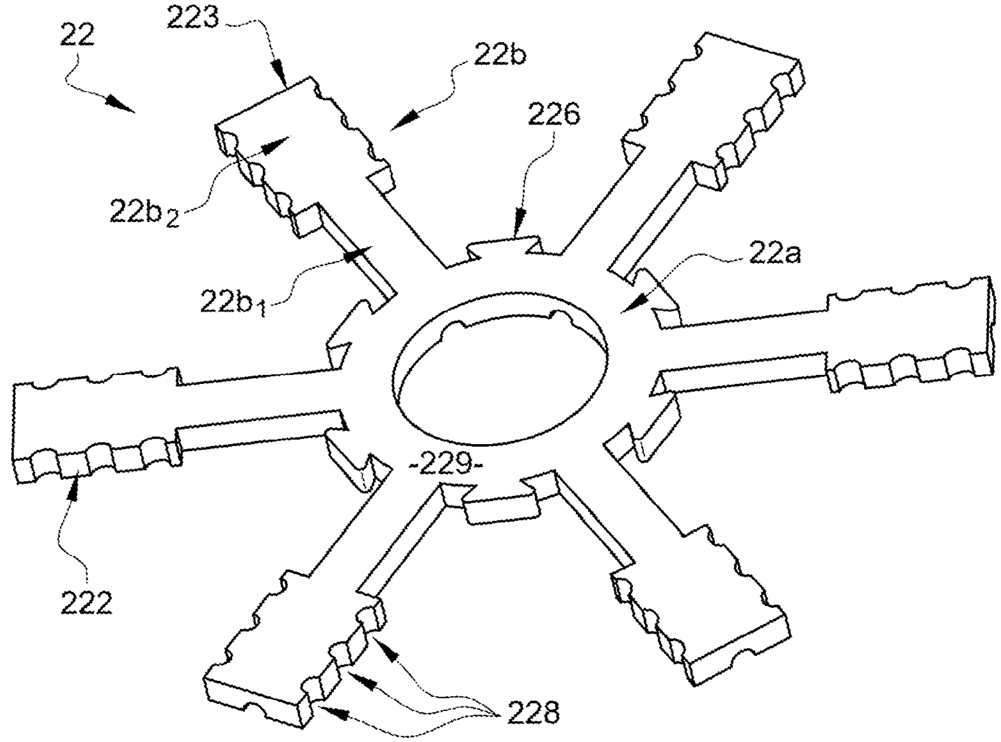
FIG. 9 is a perspective view of the external face of the cover of the flange shown in FIG. 6.
Figure 10:
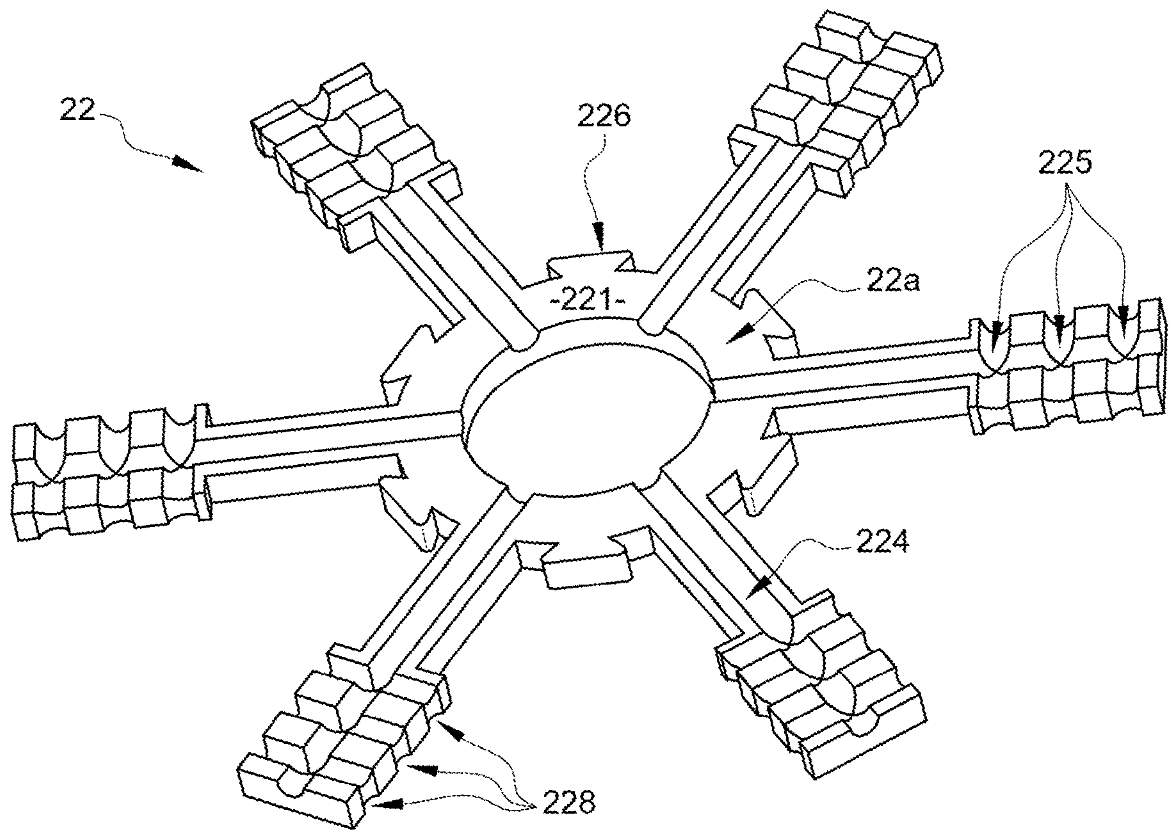
FIG. 10 is a perspective view of the internal face of the cover of the flange shown in FIG. 6.

For this purpose, and as shown in FIGS. 9 and 10, the cover 22 has a shape complementary to the cavity 21 of the winding flange 15.

The cover 22 comprises in particular a central part 22*a* of annular shape intended to fit inside the central part 21*a* of the cavity 21. In order to secure the coupling of the cover 22 on the winding flange 15, the cover 22 is advantageously provided with dovetail ribs 226 forming projections at the external periphery of the central part 22*a* of the cover 22, said ribs 226 having a shape complementary to that of corresponding hollow shapes 216 of the winding flange 15 (see FIG. 7), each of said hollow shapes 216 being intended to house one of said ribs 226.

The cover 22 also comprises several radial extensions 22*b* extending radially from the central part 22*a*. Each of the radial extensions 22*b* comprises a narrow portion 22*b*1 extended radially by an enlarged portion 22*b*2. The radial extensions 22*b* are intended to fit inside the radial extensions 21*b* of the cavity 21.

The cover 22 is in particular delimited by an internal wall 221, which is in contact with the bottom wall 211 of the cavity 21, by an external wall 229, which is opposite the internal wall 221, by several lateral walls 222, which are in contact with the lateral walls 212 of the cavity 21, and by several lateral walls 223, which are in contact with the lateral walls 213 of the cavity 21.

The internal wall 221 is provided with first grooves 224 oriented radially with respect to the axis X and forming, in combination with the first grooves 214 of the cavity 21, first sections of radial fluid outlet channels for the front winding flange 15. Each of said first sections opens, at its distal end, onto one of the through openings 217 of the winding flange 15, which form second sections of said radial fluid outlet channels. Moreover, each of said first sections opens, at its proximal end, onto a through hole 125 formed inside the shaft 12 and oriented radially with respect to the axis inside the front end portion 121 so as to open, on one side, into the first fluid inlet channel 124 and, on the other side, at the level of the peripheral wall of the shaft 12. Similarly, several holes 127 oriented radially relative to the axis X of the shaft 12 are formed inside the rear end portion 123 so as to open, on one side, into the second fluid inlet channel 126 and, on the other side, at the peripheral wall of the shaft. These holes 125, 127 will allow suppling fluid to the radial fluid outlet channels of the front and rear winding flanges 15, 15' respectively.

The internal wall 221 is also provided with second grooves 225 oriented orthoradially with respect to the axis X and forming, in combination with the second grooves 215 of the cavity 21, intermediate fluid circulation channels for the front winding flange 15, said intermediate fluid circulation channels being in fluid communication with the radial fluid outlet channels. These intermediate fluid circulation channels are supplied with fluid by the first sections of the radial fluid inlet channels constituted by the grooves 214 and 224.

The lateral walls 222 of the cover 22 are, for their part, provided with third grooves 228 oriented parallel to the axis X and forming, in combination with the third grooves 218 of the cavity 21, axial fluid outlet channels for the front winding flange 15, said axial fluid outlet channels being in fluid communication with the intermediate fluid circulation channels. Each of the axial fluid outlet channels thus opens onto the axial fluid outlet opening 220 located on the external lateral face 155 of the winding flange 15.

Thus configured, the rotor 10 and the motor 1 can be cooled by a cooling fluid, such as oil or air under pressure for example, said cooling fluid circulating in the rotor 10 successively through the first fluid inlet channel 124 and/or the second fluid inlet channel 126, then inside the front and/or rear winding flanges 15, 15' through the radial fluid outlet channels, intermediate fluid circulation channels and/or axial fluid outlet channels, to finally be expelled out of the rotor 10 through the radial fluid outlet openings 219 and/or the axial fluid outlet openings 220. Subsequently, this cooling fluid is directed towards the winding heads 13 and/or towards the windings 16 such that, once in contact with the winding heads 13 and/or the windings 16, it can extract part of the heat stored in said winding heads 13 and/or by said windings 16. The cooling fluid then circulates, under the effect of gravity, in the lower part of the casing before being removed via the openings 7.

The disclosure is obviously not limited to the embodiments as described above. In particular, in other embodiments (not shown) of the disclosure, the front and/or rear winding flanges 15, 15' may only be provided with radial fluid outlet channels or only with axial fluid outlet channels. Moreover, the presence of a cover 22 housed inside a central cavity 21 of the front 15, respectively rear 15' winding flange, is only one possibility for forming the fluid circulation channels. In other embodiments of the disclosure, it is possible not to provide such a cover and such a cavity.

The invention claimed is:

1. A wound rotor for electric motor comprising:

a rotor shaft rotary mounted about an axis;

a stack of laminations mounted coaxially on the rotor shaft, said stack of laminations extending between a front lateral face and a rear lateral face and having an alternation of poles and interpolar spaces;

a front winding flange and a rear winding flange mounted coaxially on the rotor shaft and arranged axially on either side of the stack of laminations so as to be contiguous respectively to the front and rear lateral faces of the stack of laminations, said front and rear winding flanges each having a series of radial branches in the shape of a T, each of said radial branches being aligned axially with one of the poles of the stack of laminations and having a profile similar or identical to that of said pole in a plane perpendicular to the axis of the shaft;

windings partially surrounding the poles of the stack of laminations and the radial branches of the front and rear winding flanges;

wherein the shaft is provided with at least one internal channel for circulating a cooling fluid, called a fluid inlet channel, and in that the front winding flange and/or the rear winding flange is crossed by several radial fluid outlet channels oriented radially relative to the axis of the shaft and inside which can circulate a cooling fluid, each of said radial fluid outlet channels being in fluid communication with said fluid inlet channel and opening at a radial fluid outlet opening located at the external periphery of said front winding flange and/or said rear winding flange, and wherein the front, respectively rear winding flange, is also crossed by a plurality of intermediate channels, each of said intermediate channels being orthogonally oriented to one of the radial fluid outlet channels and opening, at a first end, into said radial fluid outlet channel and, at a second end, into an axial fluid outlet channel opening at the level of an axial fluid outlet opening located on an external lateral face of said front, respectively rear winding flange.

2. The wound rotor according to claim 1, wherein the shaft comprises a front end portion and a rear end portion separated from the front end portion by a central portion, the central portion and at least partially the front and rear end portions being crossed by a blind hole aligned along the axis of the shaft, said blind hole forming the fluid inlet channel.

3. The wound rotor according to claim 1, wherein each of the radial fluid outlet channels passes through one of the radial branches of the front, respectively rear winding flange.

4. The wound rotor according to claim 1, wherein the front and rear winding flanges are made of a material selected from aluminum or a plastic material.

5. An electric motor comprising a wound rotor according to claim 1 and an annular stator which surrounds the rotor coaxially with the shaft, winding heads projecting axially from either side of the stator, wherein the radial fluid outlet openings, through which the cooling fluid exits the front and/or rear winding flanges, are aligned axially with the winding heads so as to allow a cooling of said winding heads via said cooling fluid.

6. The wound rotor according to claim 1, wherein the shaft is provided with a first internal channel for circulating a cooling fluid, called first fluid inlet channel, and a second internal channel for circulating a cooling fluid, called second fluid inlet channel, wherein each of the radial fluid outlet channels crossing the front winding flange, respectively the rear winding flange, is in fluid communication with the first fluid inlet channel, respectively the second fluid inlet channel, and opening at a radial fluid outlet opening located at the external periphery of said front winding flange, respectively of said rear winding flange.

7. The wound rotor according to claim 6, wherein the shaft comprises a front end portion and a rear end portion separated from the front end portion by a central portion, the front end portion, respectively the rear end portion, being crossed by a blind hole aligned along the axis of the shaft, said blind hole forming the first fluid inlet channel, respectively the second fluid inlet channel.

8. The wound rotor according to claim 7, wherein several connecting holes oriented radially relative to the axis of the shaft are formed inside the front end portion, respectively the rear end portion, so as to open, on one side, into the fluid inlet channel, or respectively into the first and second fluid inlet channels, and, on the other side, in the radial fluid outlet channels.

9. The wound rotor according to claim 1, wherein the front, respectively rear winding flange, has an internal lateral face in contact with the front, respectively rear lateral face, of the stack of laminations, said internal lateral face being provided with a cavity in which a cover is housed, said cavity being configured to form, in combination with said cover, a first section of the radial fluid outlet channels, as well as the intermediate channels and the axial fluid outlet channels.

10. The wound rotor according to claim 9, wherein the cavity comprises a central part of annular shape, which extends radially from a hollowed central zone of the front, respectively rear winding flange, said central zone being configured to partially house the shaft of the rotor, and several radial extensions extending radially from said central part, each of the radial extensions being aligned with one of the radial branches of the front, respectively rear winding flange.

11. The wound rotor according to claim 10, wherein the cavity is delimited by a bottom wall and by several lateral walls oriented perpendicular to said bottom wall, said bottom wall being provided with first grooves oriented radially relative to the axis of the shaft and second grooves oriented orthoradially relative to the axis of the shaft, said first and second grooves forming respectively, in combination with corresponding grooves to the cover, the first section of the radial fluid outlet channels and the intermediate channels.

12. The wound rotor according to claim 11, wherein several lateral walls, which are oriented radially relative to the axis of the shaft, are provided with third grooves oriented parallel to the axis of the shaft, said third grooves forming, in combination with corresponding grooves of the cover, the axial fluid outlet channels.

13. The wound rotor according to claim 10, wherein the cavity is configured to form housings arranged radially about the central part, each of the housings having a specific shape and being intended to receive a connecting element corresponding to the cover having a shape complementary to that of said housing, said specific shape and said complementary shape being configured to prevent any relative movement between the cover and the front, respectively rear winding flange, in a radial direction, thus securing the coupling of the cover on the front, respectively rear winding flange.

14. The wound rotor according to claim 13, the housings of the cavity have a dovetail shape.

* * * * *